(12) United States Patent
Judd

(10) Patent No.: US 10,879,609 B1
(45) Date of Patent: Dec. 29, 2020

(54) WAVE CONSTRUCTION METHOD FOR CONTROLLING, ROTATING, OR SHAPING RADIO FREQUENCY OR ACOUSTIC WAVES IN FREE SPACE OR IN A FLUID

(71) Applicant: Mano Judd, Heath, TX (US)

(72) Inventor: Mano Judd, Heath, TX (US)

( * ) Notice: Subject to any disclaimer, the term of this patent is extended or adjusted under 35 U.S.C. 154(b) by 248 days.

(21) Appl. No.: 15/934,563

(22) Filed: Mar. 23, 2018

(51) Int. Cl.
| | | |
|---|---|---|
| *H01Q 3/34* | (2006.01) | |
| *F41H 11/02* | (2006.01) | |
| *H01Q 3/30* | (2006.01) | |
| *G01S 7/38* | (2006.01) | |

(52) U.S. Cl.
CPC ............... *H01Q 3/34* (2013.01); *F41H 11/02* (2013.01); *G01S 7/38* (2013.01); *H01Q 3/30* (2013.01)

(58) Field of Classification Search
CPC .. F41H 11/02; H01Q 3/34; H01Q 3/30; G01S 7/38
See application file for complete search history.

(56) References Cited

U.S. PATENT DOCUMENTS

| | | | | |
|---|---|---|---|---|
| 4,117,484 A | * | 9/1978 | Shizume | ............. G01S 7/38 342/15 |
| 8,009,094 B2 | * | 8/2011 | Freed | ............. H01Q 3/30 342/360 |
| 2011/0001652 A1 | * | 1/2011 | Martino | ............. G01S 7/40 342/14 |

FOREIGN PATENT DOCUMENTS

FR 2328203 A1 * 5/1977 ............... G01S 7/38

* cited by examiner

*Primary Examiner* — Cassi J Galt

(57) ABSTRACT

A wave construction method is described that can be used to generate a new and different wave front, which is not parallel to the natural expanding wave front from the emitted signal generated from the source array. Restated, a wave construction method is described that can be used to generate a new and different wave front which is not perpendicular to the direction from the source array to the center of the wave front. This method can also be used to shape a wave in the far field or near field, by changing the locations of the computed points, and generating a linear or non-linear shaped wave (front). This disclosure allows for the controlling, rotating, or shaping radio frequency or acoustic waves in free space or in a fluid.

8 Claims, 22 Drawing Sheets

PRIOR ART

PRIOR ART

PRIOR ART

PRIOR ART

WAVE CONSTRUCTION METHOD FOR CONTROLLING, ROTATING, OR SHAPING RADIO FREQUENCY OR ACOUSTIC WAVES IN FREE SPACE OR IN A FLUID

The present application claims priority to the earlier filed provisional application having Ser. No. 62/601,732, and hereby incorporates subject matter of the provisional application in its entirety.

TECHNICAL

Field

Within a phased array, either a Radio Frequency (RF) antenna or (very low frequency) acoustic array, the magnitude and phase of a relationship resulting from the weighted sum of some or all array elements, are employed to derive a pre-determined value for the wave magnitude and phase of a far field multiplicity of points in space or within a fluid. For an RF system, this can be an electric field magnitude for a far field multiplicity of points in space. For an acoustic system, this can be the pressure wave of a far field multiplicity of points in either space (air) or within a fluid (such as water, or the ocean). A single set of complex weights is applied to all elements in the array. These weights, multiplied by the coherent carrier signal (for RF) and multiplied by the baseband signal, at each antenna element in the array, produces a synthesized magnitude and phase for each designated far field point in space or in a fluid. This process can be used to generate a new and different wave front, which is not planar to the natural expanding wave front of the array generated signal; when not using the complex weights. This process can also be used to shape a wave in the far field, by changing the locations of the computed points, and generating a non-linear shaped wave (front). Applications include, but are not limited, to spoofing or fooling (RF) Surface to Air Missile systems, incoming missiles, and (Acoustic) decoys to fool torpedo's or submarine acoustic detection and tracking systems.

Background of the Invention

A directional antenna will focus RF energy along a constant bearing angle, to a far field location (or line) in space. This is shown in FIG. 1A. The antenna coherently transmits wave energy such that the energy adds constructively in the far field, along an infinite line in space. However, maximum energy is enabled at only a point or line; parallel with the direction of wave propagation. Similarly, an acoustic wave, generated from an acoustic transducer (shown in FIG. 2B) will generate a wave and propagate in the same sense; however, the wave energy will be due to pressure/compression of fluid or gas.

The conventional RF beamformer is a delay and sum mechanism for an array, that receives or generates (radiates) signal energy from M antennas and controls and varies the phase of the M radiated waves to produce constructive interference at a given far field point or line. This produces an array "beam" with coherent phasing virtually out to infinity (distance). The key point is that the phasing and control of the array antenna element's phase and amplitudes, using a set of complex digital array weights, ($\underline{h}$), is to produce this constructive interference event at a single point, or single line (from the array to the far field point). This is shown in FIG. 1B. This information is common and known to professionals in the field of spatial Digital Signal Processing (DSP).

There are arrays that can generate (N) simultaneous multiple beams, however, each beam has a unique and different set of complex weights, $\underline{h}_1, \underline{h}_2, \ldots \underline{h}_N$. Each beam has its own unique direction of propagation of its wave. The final resultant wave is enabled by the multiplication of a combined set of beamformed weights hfinal= $\underline{h}_1+\underline{h}_2+ \ldots +\underline{h}_N$, where each $h_i$ (I=1, 2, . . . , N) is the individual complex multiplicative weight for each beam. Therefore, linear combinations of these weights can be used to generate a simultaneous set of beams; for the same signal. This is shown in FIG. 1C.

Whether an RF (or acoustic) wave is generated from an omni-directional antenna multiplicity (or of acoustic transducers), a directional antenna, or a phased array antenna system, the far field wave will be effectively "planar" and perpendicular to the propagation direction of the wave. This is shown in FIG. 1D, where the curvature of the outgoing wave is reduced, as the wave gets further away from the (radiating) source or antenna. In the very far field, the curvature is so minimal, across say a 20 to 100 foot length at microwave frequencies, that the wave front can be considered planar (flat). In military, and some commercial systems, the planarity of these wave is used to estimate the bearing angle to the source. This is the case with passive direction finding or bistatic radar systems. These systems use various methods to correlate the signal energy, to estimate the direction angle back to the radiating antenna or phased array. However, they all rely on the physics that the far field planar wave is perpendicular to the direction of propagation of the wave.

BRIEF SUMMARY OF THE INVENTION

In this invention, Wave Mechanics technology, a radiating signal can be constructed, from a phased array system of M antennas (or transducers, for acoustics), such that the far field wave at a given point is rotated by a predetermined or computed angle, (β). This is shown in FIG. 1E. This rotated wave has all the properties of the natural wave, and is therefore received by the passive direction finding system or radar, with an estimated angle that is not perpendicular to the source direction of wave propagation.

The Wave Mechanics technology uses phase and amplitude control and variation, at each antenna element within the array and produces simultaneous summing and constructive (and/or destructive) interference at a multiplicity of pre-determined (calculated) points in the Far Field. This in effect also produces the same summing or interference at all points between and around the pre-determined points, to appear as a "wall" of controlled and directed wave front. All of the different far field points are derived from the same set of complex weights, $\underline{h}$.

The Wave Mechanics technique generates a collection or multiplicity of points, from a single set of M complex weights, $\underline{h}$ for a multiplicity of (M) RF antennas, or acoustic transducers. These points emulate the same in-phase characteristics as the natural expanding wave, but either rotated or "wrapped" onto a different virtual surface; that is not perpendicular to the location of the transmitting array. For the case of the rotated wave, the Wave Mechanics technique generates an actual wavefront, that is however, rotated from the natural wave, at a preset/pre-calculated rotation angle, β.

BRIEF DESCRIPTION OF THE DRAWINGS

For a more complete understanding of the present invention, reference is now made to the following descriptions taken in conjunction with the accompanying drawings, in which:

Comment: FIGS. 3A through 6A refer to RF techniques and mathematics, but are all equivalent to acoustic mathematics and applications.

FIG. 3A-FIG. 3A illustrates a multiplicity of RF antennas, 101a through 101M, as an array, and the far field point, 105a, at which the Wave Mechanics process is to be focused to. It should be noted that the actual distance from the multiplicity of antennas, 101a through 101M, to the far field point, 105a, would be larger than the physical size of the array of antennas.

FIG. 3E-FIG. 3E illustrates the set of ranges $r_{ij}$ from each antenna, to far field point #1, 105a. The total field at far field point #1, 105a, is the summation of the fields generated from the multiplicity of antennas, 101a through 101M, with respective ranges $r_{11}, r_{21}, \ldots, r_{M1}$. This collection of ranges to a single point can be denoted as a "butterfly". It is similar in concept to the butterfly used in generating Fast Fourier Transforms (FFT) in Digital Signal Processing. This can be denoted the "butterfly" for far field point #1, 105a.

FIG. 6A-FIG. 6A shows a comparison of a conventional beamformer, of M antennas, to the Wave Mechanics principle. The traditional (conventional) Beamformer computes a set of complex digital weights, $\underline{h}$, to generate RF constructive interference at a <u>single</u> point in space. Due to geometry, where $r_{ij} >>> \lambda$, the <u>single</u> far field point in space can be any far field point along a line from the transmit antenna out to infinity. In contrast, the Wave Mechanics technology computes h to generate constructive interference, <u>simultaneously</u>, at a <u>multiplicity</u> of points in space (e.g. the Far Field), and generates the wave rotation or shaping within a <u>finite</u> width corridor in the Far Field.

DETAILED DESCRIPTION OF THE INVENTION

Figure 1A:
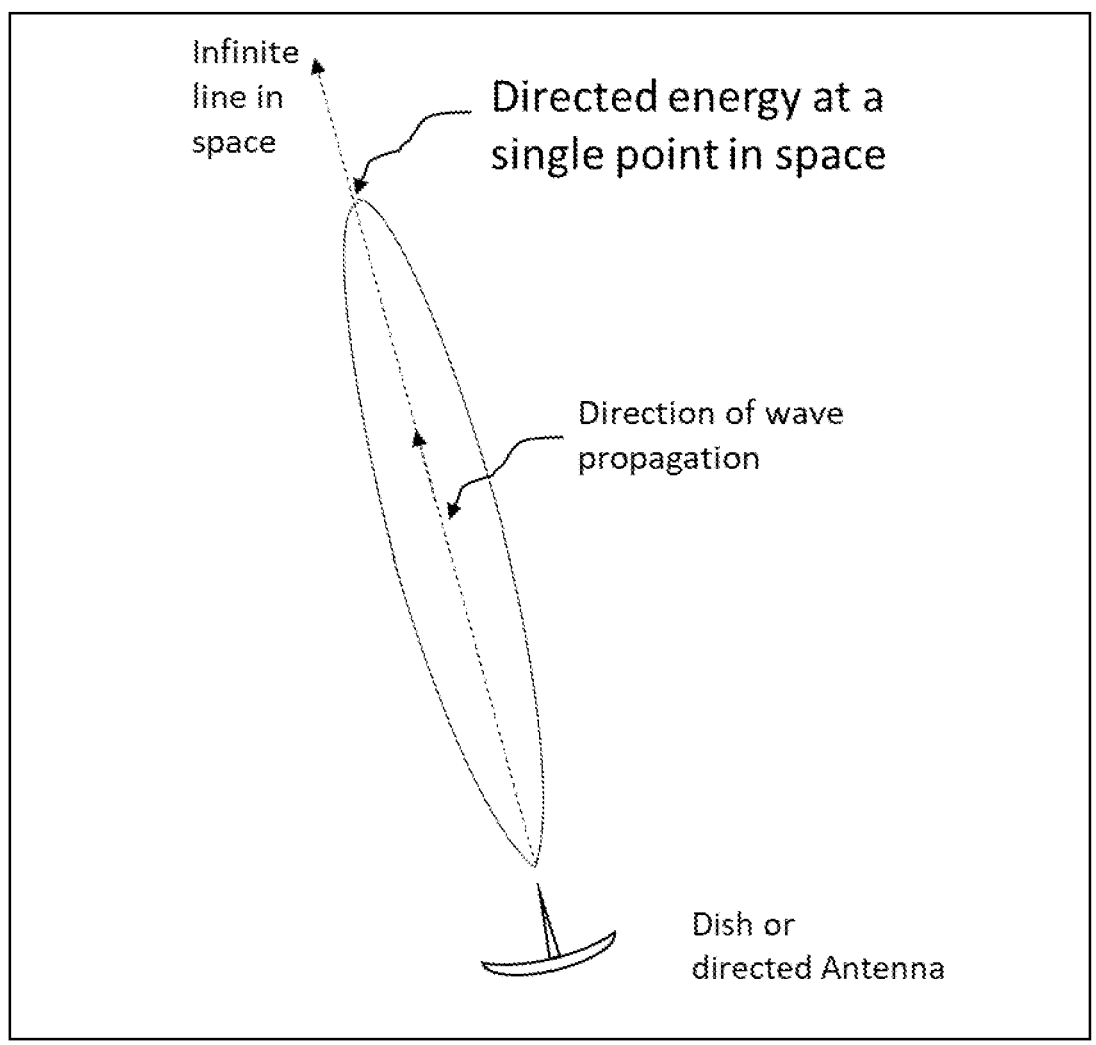
FIG. 1A-FIG. 1A illustrates the RF beam generated by the system of FIG. 2A, that radiates (or travels) along the direction of propagation of the wave. For this illustration an (RF) Dish or directive antenna is shown. Another embodiment of this technique would be an acoustic wave generated by the system of FIG. 2B. For acoustics, the wave emitter/radiator would be an acoustic transducer.
Figure 1B:
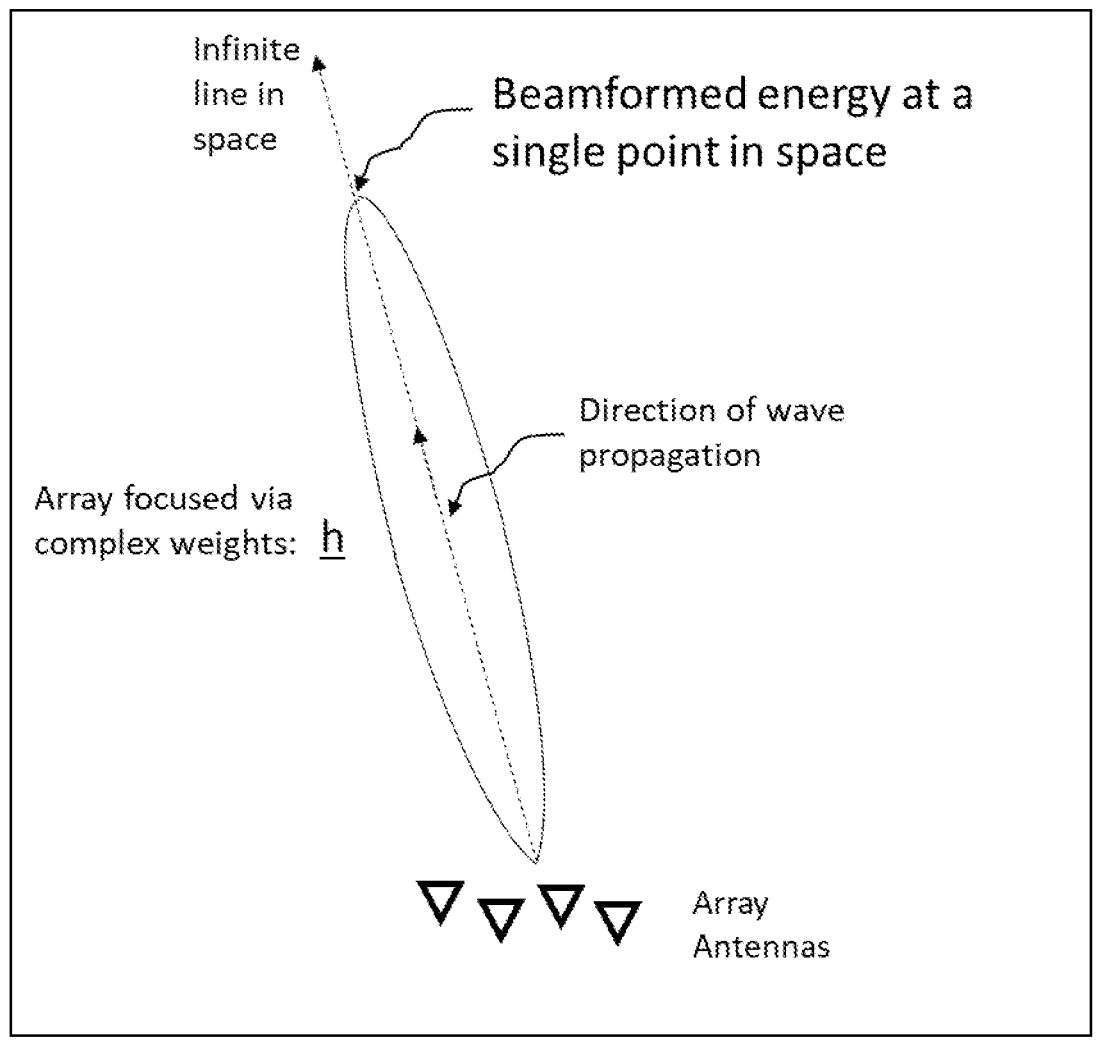
FIG. 1B-FIG. 1B illustrates the RF beam that radiates (or travels) along the direction of propagation of the wave, generated from a multiplicity of RF antennas. For this illustration an (RF) Array of antennas is shown. Another embodiment of this technique would be an acoustic wave. For acoustics, the wave generation array would be an acoustic transducer array.
Figure 1C:
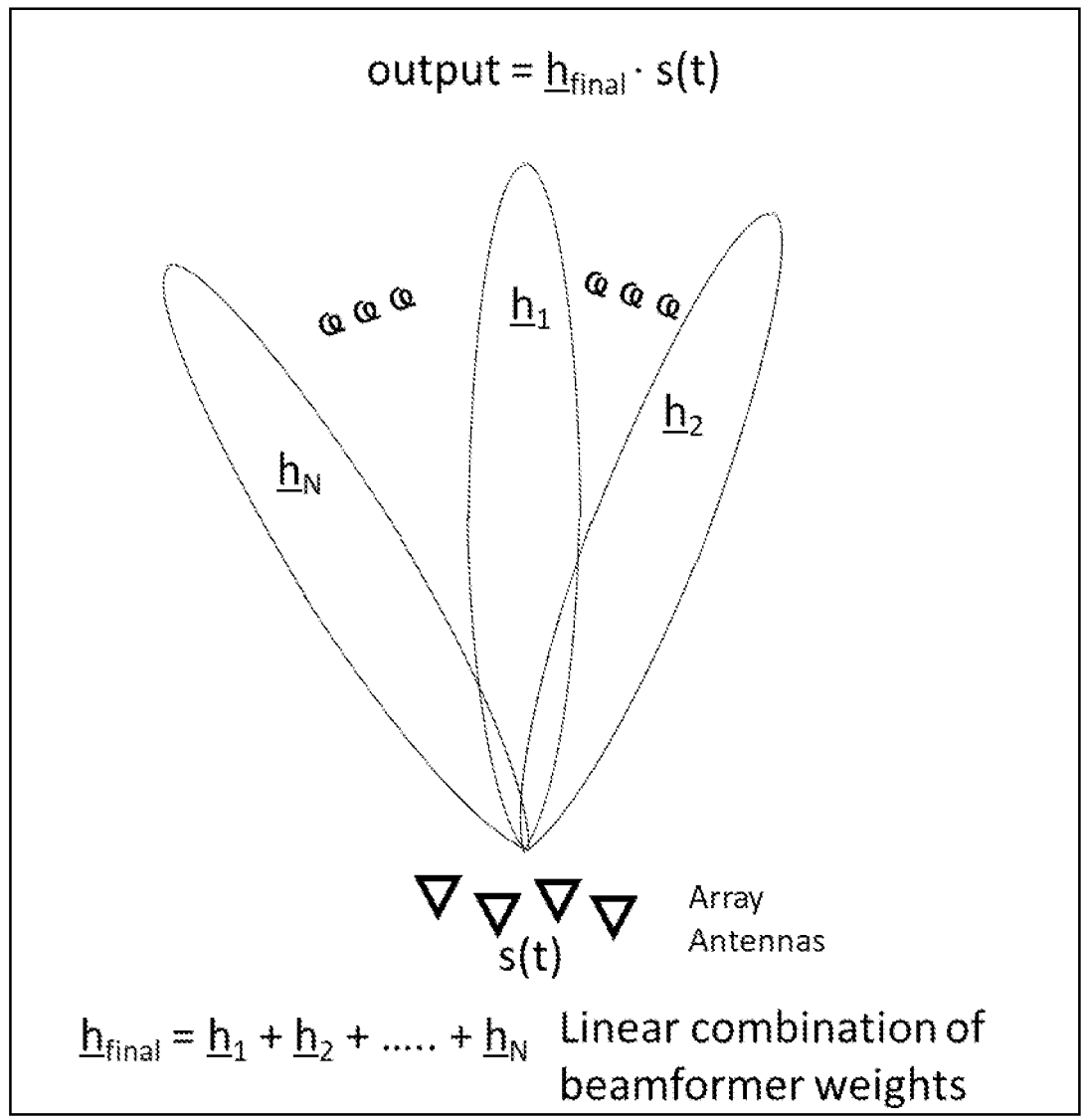
FIG. 1C-FIG. 1C illustrates multiple RF beams radiates from a single antenna array. Each beam has its own unique direction of propagation of its wave. The waves are enabled by the multiplication of a combined set of beamformed weights $\underline{h}=\underline{h}_1+\underline{h}_2+\ldots+\underline{h}_N$, where each $\underline{h}_i$ (i=1, 2, ..., N) is the individual complex multiplicative weight for each $i^{th}$ beam.
Figure 1D:
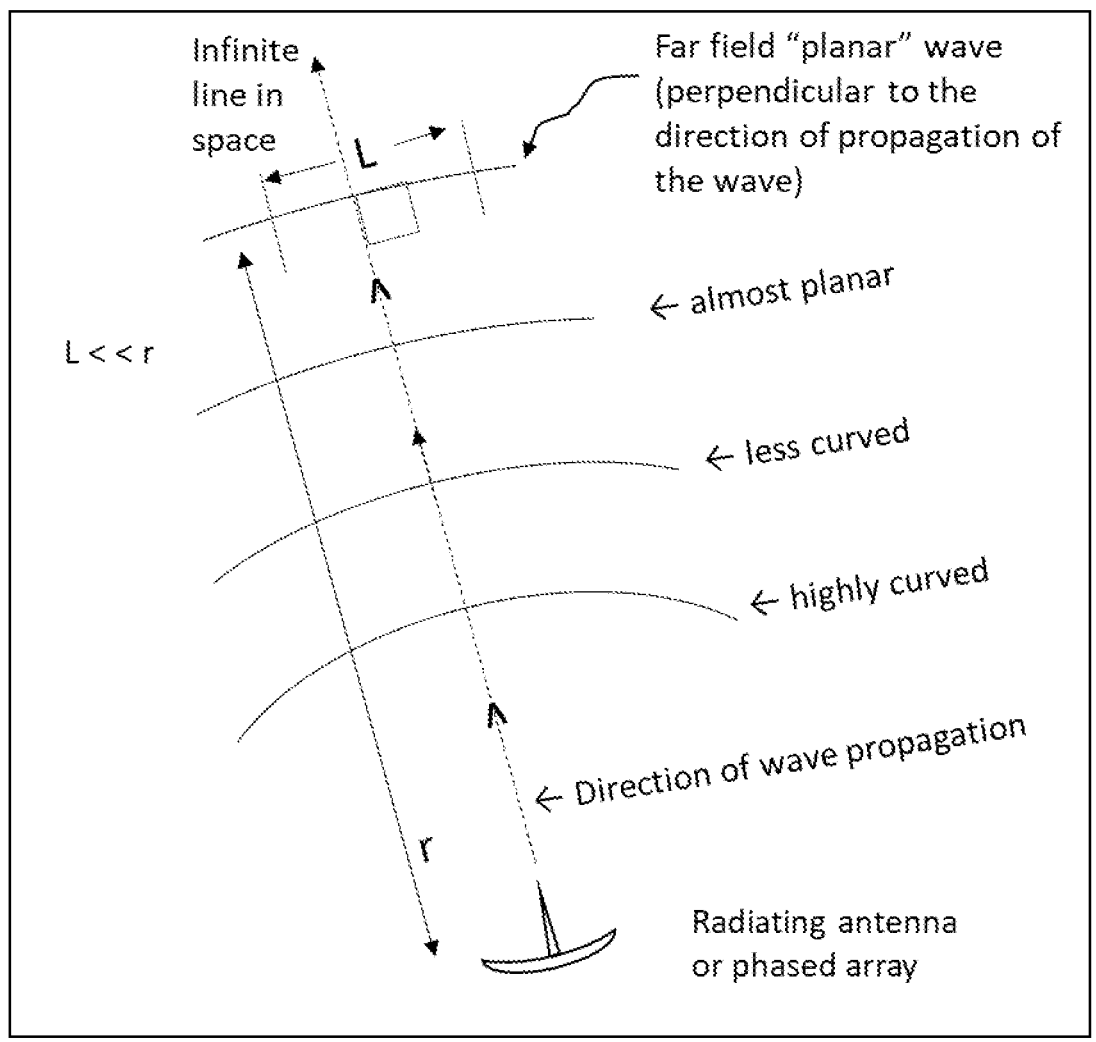
FIG. 1D-FIG. 1D illustrates the outward motion of originally curved wave into planar waves in the far field. As a wave front gets further away from its source of generation, the expanding sphere of the wave front becomes planar in a finite local region, L. The local region is defined where L<<r. Furthermore, the planar wave front is perpendicular to the direction of propagation of the wave.
Figure 1E:
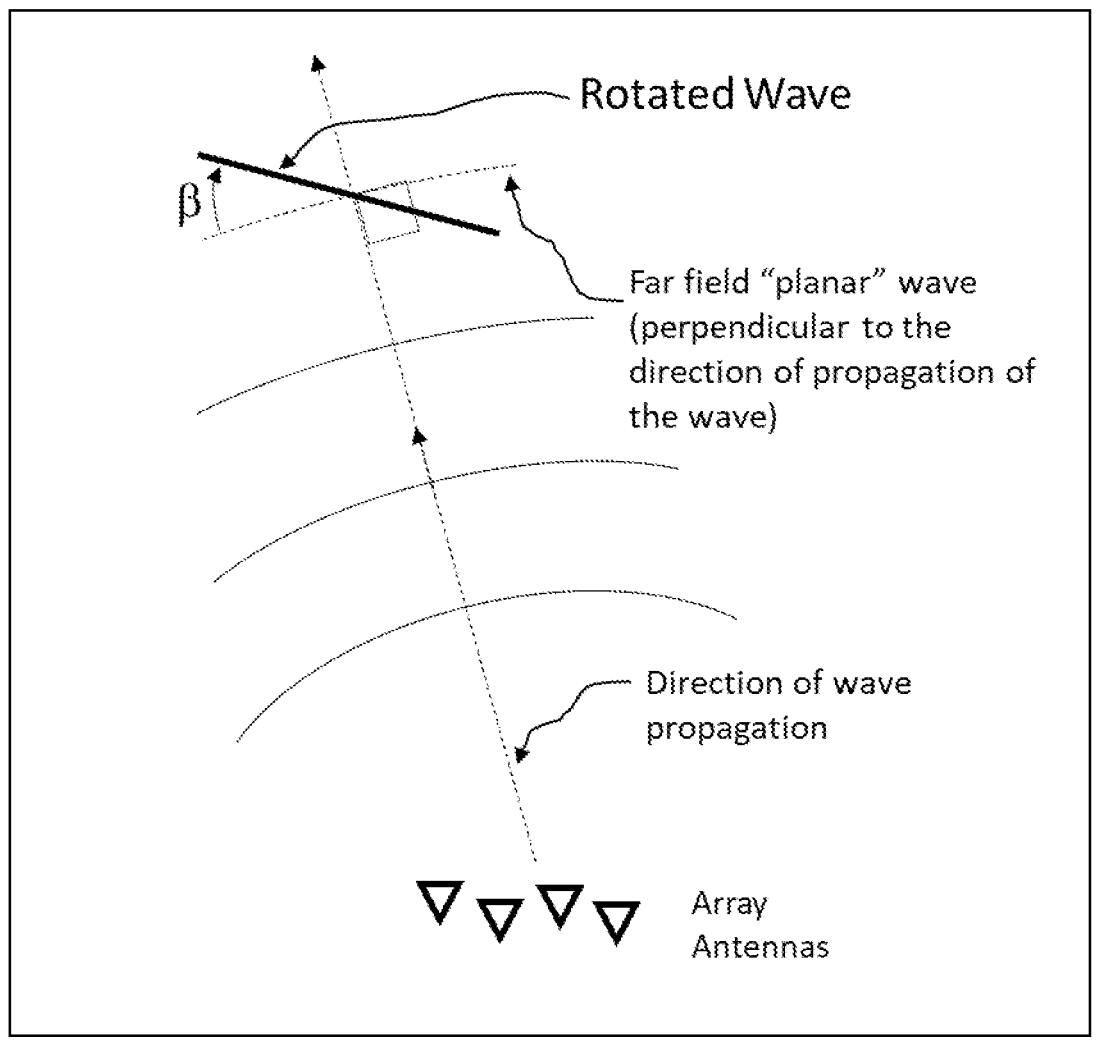
FIG. 1E-FIG. 1E illustrates one embodiment resultant, that of a rotated wave. A rotated wave is generated from the Wave Mechanics system and mathematics. If received from a passive DF system or radar receiving antenna or array, the receiving system will estimate or compute that the wave originated from a direction that is not in the direction (of wave propagation) of the actual source array, shown at the bottom of the diagram.
Figure 2A:
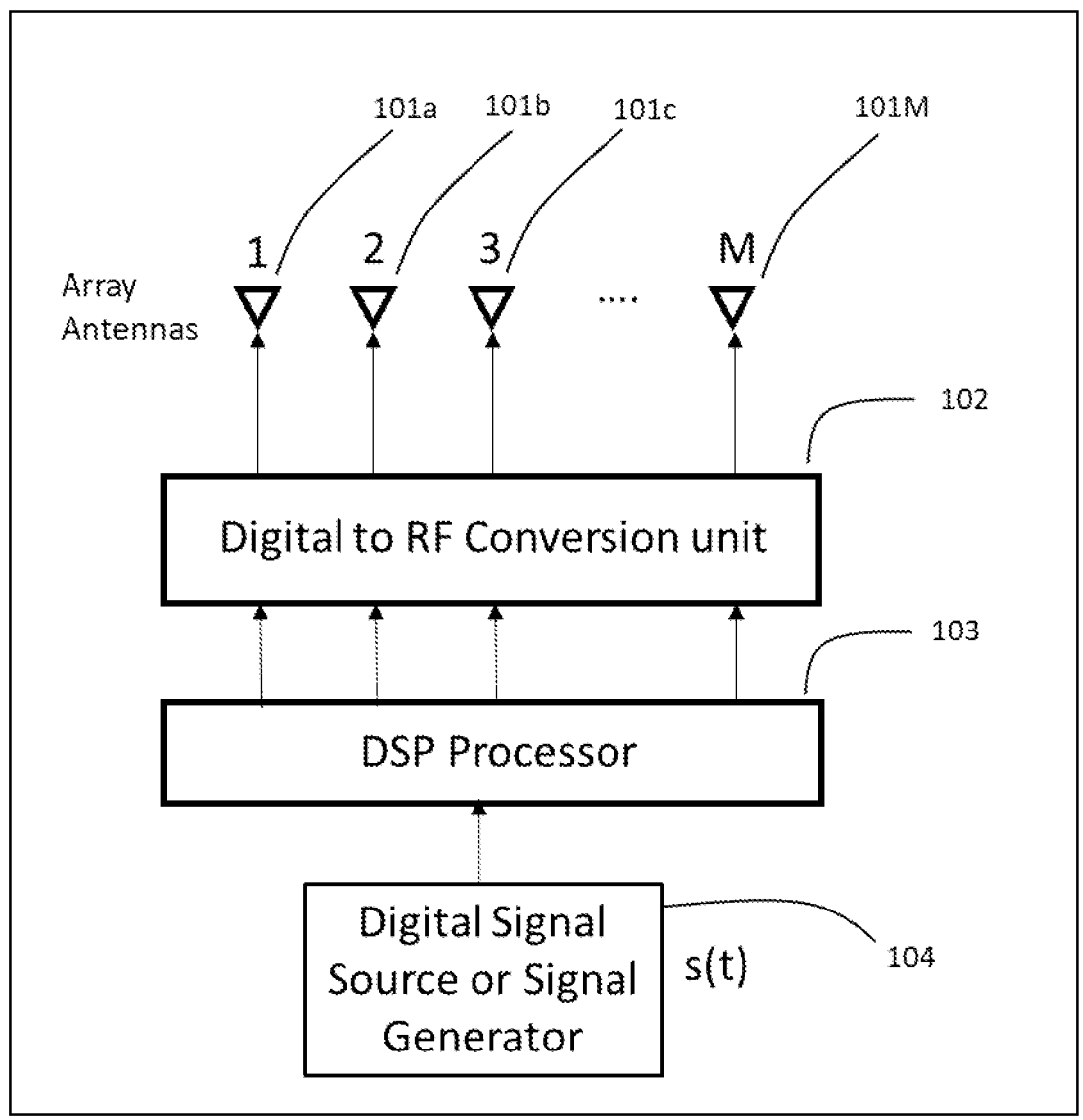
FIG. 2A-FIG. 2A shows a block diagram of one embodiment of the Wave Mechanics transmission system. This particular embodiment of the invention includes, but is not limited to, baseband signal conversion to RF for a multiplicity (array) of antennas. The source signal generator, 104, produces a digital signal that is processed by the DSP processor block, 103, which also multiplies the signal, s(t), by the weight vector $\underline{h}$, and forwards each antenna signal to the multi-channel Digital to RF converter, 102. As one embodiment of this invention, the processed signal is first converted to analog, within a spatial channel, via a Digital-to-Analog Converter (DAC), and then RF mixed or upconverted to RF. This conversion process is usually performed coherently, however, there are other embodiments that would not require coherent upconversion.

FIG. 2A shows the block diagram of one embodiment of the Wave Mechanics transmission system; for an antenna/array (RF) system. This is comprised of a multiplicity of M antenna elements, 101a through 101M, each fed by a coherent (in phase) RF converted signal. This embodiment of the present invention includes, but is not limited to, baseband signal conversion to RF, for a multiplicity (array) of antennas. The source signal generator, 104, produces a digital signal that is processed by the DSP processing block, 103, which also multiplies the signal, s(t), by the weight vector, $\underline{h}$, and forwards each antenna signal to the Digital to RF converter block, 102.

As one embodiment of this invention, the processed signal is first converted to analog, within a spatial channel, via a Digital-to-Analog Converter (DAC), and then RF mixed or upconverted to RF. This conversion process is usually performed coherently, however, there are other embodiments that would not require coherent upconversion. The Digital to RF Conversion can be accomplished via an RF Exciter, a Digital to Analog Converter (DAC), an RF Transceiver, or a split RF synthesizer. The Signal Source could be any type of baseband source that is then digitized; prior to the Digital to RF Conversion stage. The Digital Signal Processing (DSP) processor both computes the optimal weight vector, $\underline{h}$, as well as performs the real time multiplication at the baseband ample rate, of:

$$\text{output} = \underline{h}(t) \cdot s(t) \tag{1}$$

The process inputs the digitized signal, s(t), copies the signal M times, and multiplies each sample; for the same time instant, by $h_i$, where i=1, 2, ..., M is the antenna reference number.

Note, this is similar to the conventional beamformer process, however only in the generation of the output (s(t)·$\underline{h}$). For the Wave Mechanics technology, $\underline{h}$ is generated completely different from the method the conventional beamformer uses to compute $\underline{h}$.

Figure 2B:
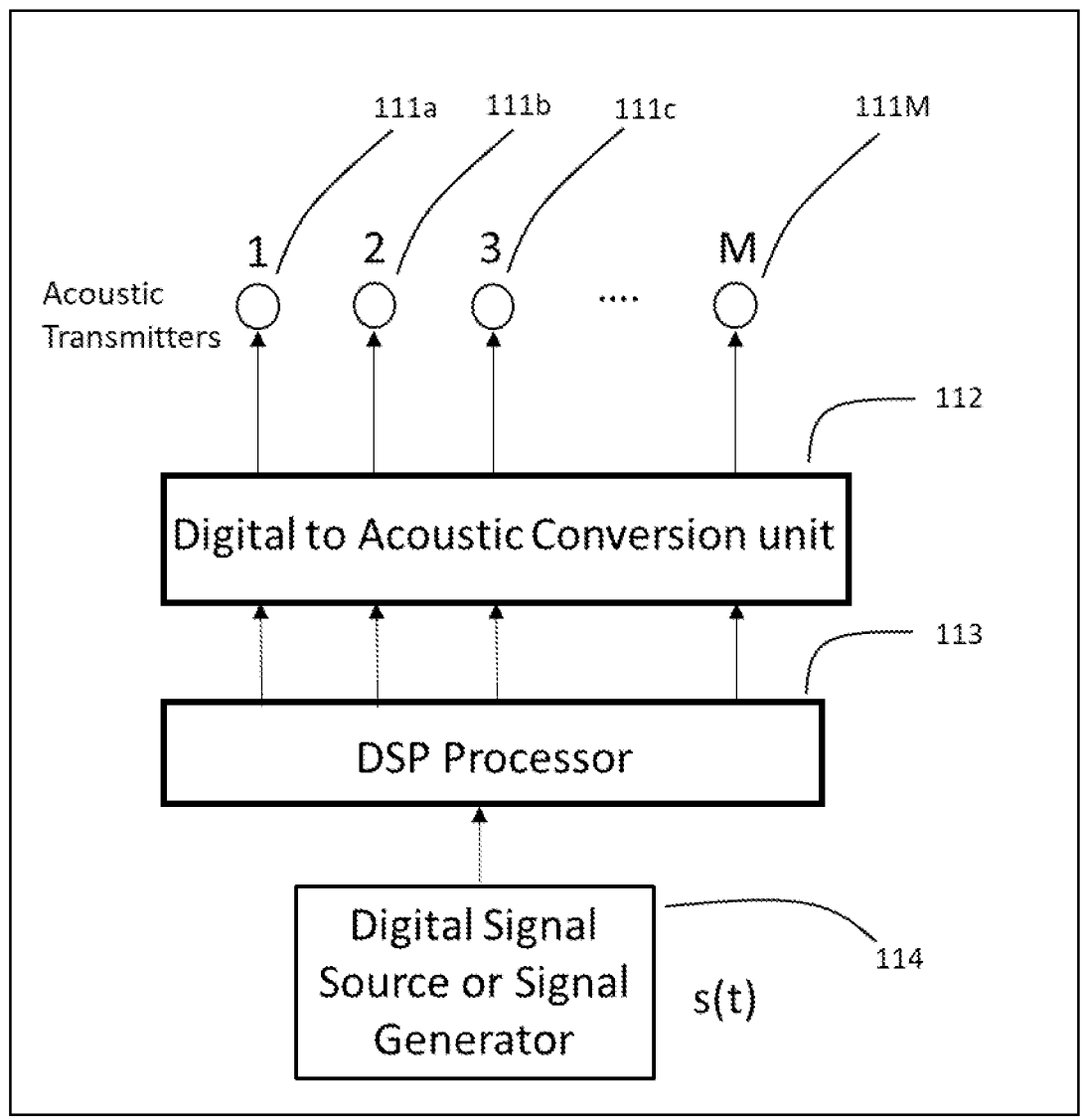
FIG. 2B-FIG. 2B shows a block diagram of another embodiment of the Wave Mechanics transmission system. This particular embodiment of the invention includes, but is not limited to, baseband to acoustic signal conversion for a multiplicity (array) of acoustic transducers. The source signal generator, 114, produces a digital signal that is processed by the DSP processor block, 113. which also multiplies the signal, s(t), by the weight vector, $\underline{h}$, and forwards each antenna signal to the Digital to acoustic signal converter, 112. As one embodiment of this invention, the processed signal is first converted to analog, within each spatial channel, via a Digital-to-Analog Converter (DAC), and then converted to an acoustic signal. This conversion process is usually performed coherently, however, there are other embodiments that would not require coherent conversion.

FIG. 2B shows the general embodiment of the same system, however, for acoustics applications and frequencies.

For a tone that is transmitted (radiated) from an Antenna #1, at a distance, r, in the far field from the antenna, the field voltage for any far field distance (r) frequency (f) and time (t) can be represented as a traveling wave:

$$V(r, f, t) = \frac{1}{r} e^{j(kw + \omega t)} \tag{2}$$

In volts per meter. Where:
r=displacement (distance) from antenna #1 to distance of a given point
f=frequency of the wave
t=time, and
Where $>>\lambda$: the far field definition. The wavelength can be written in terms of the speed of light, c, and frequency, f, as:

$$\lambda = \frac{c}{f} \tag{3}$$

for acoustics, c would be the speed of sound in the fluid or air.

Figure 3A:
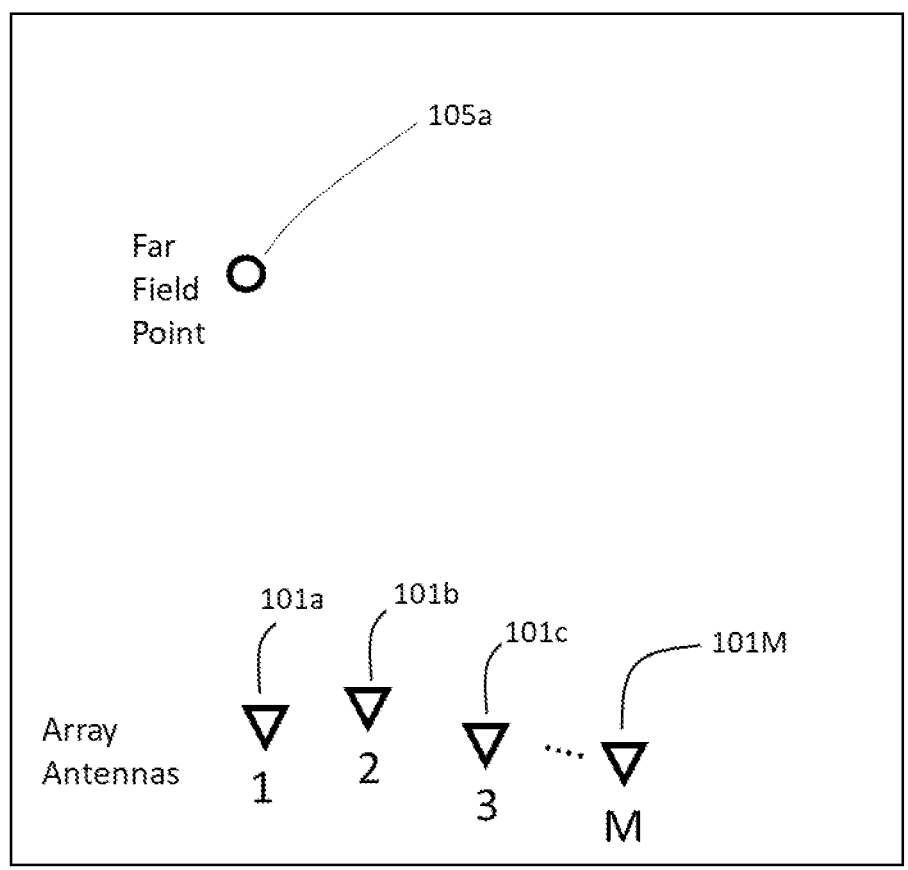
Figure 3B:
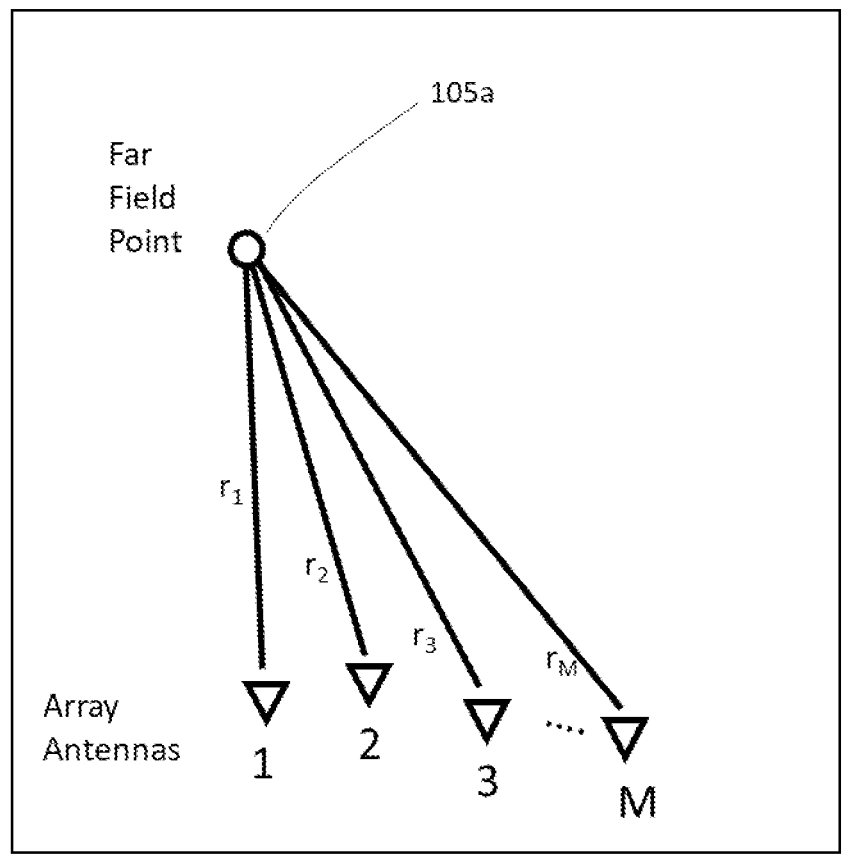
FIG. 3B-FIG. 3B illustrates the ranges from each antenna in the array to the far field point, 105a. For example, $r_1$ is the range (distance) from antenna #1 to the far field point, 105a. It should be noted that the actual distance from the multiplicity of antennas, 101a through 101M, to the far field point, 105a, would be larger than the physical size of the array of antennas.

FIG. 3A illustrates a multiplicity of RF antennas, 101a through 101M, as an array, and the far field point, 105a, at which the Wave Mechanics process is to be applied to. As shown in FIG. 3B, the lengths can be denoted as $r_1$, $r_2$, ..., $r_M$ and resulting voltage at the far field point as:

$$V(f) = \frac{1}{r_1} e^{(kr_1 + \omega t_1)} + \frac{1}{r_2} e^{(kr_2 + \omega t_2)} + \ldots + \frac{1}{r_M} e^{(kr_M + \omega t_M)} \tag{4}$$

This is the voltage sum, from the M antennas, each with a different distance and wave reference time, $t_i$. Assume that the transmitted signals from each antenna are now coherent (e.g. synchronized in time), then $$t = t_1 = t_2 = \ldots t_M \quad (5)$$

Relationship (4) can therefore be expressed as:

$$V(f, t) = \frac{1}{r_1} e^{(kr_1 + \omega t)} + \frac{1}{r_2} e^{(kr_2 + \omega t)} + \ldots + \frac{1}{r_M} e^{(kr_M + \omega t)} \quad (6)$$

By weighing each signal, transmitted from each antenna, with vector $\underline{h} = [h_1, h_2, \ldots, h_M]$, the weighted sum for (s) can be expressed as:

$$V_W(f, t) = h_1 \frac{1}{r_1} e^{(kr_1 + \omega t)} + h_2 \frac{1}{r_2} e^{(kr_2 + \omega t)} + \ldots + h_M \frac{1}{r_M} e^{(kr_M + \omega t)} \quad (7)$$

This can be expressed in vector form as:

$$V_W(f, t) = [h_1 \; h_2 \; \ldots \; h_M] \begin{bmatrix} \frac{1}{r_1} e^{(kr_1 + \omega t)} \\ \vdots \\ \frac{1}{r_M} e^{(kr_M + \omega t)} \end{bmatrix} \quad (8)$$

Or in compact form:

$$V_W(f, t) = \underline{h}^T \cdot \underline{V}(f, t) \quad (9)$$

The scalar $V_W(f,t)$ is a maximum when $\underline{h}$=conjugate $[\underline{V}(f,t)]$. This is an example of simple (conventional) RF beamforming. Without loss of generality, this derivation and expression also applies to acoustic beamforming.

Figure 3C:
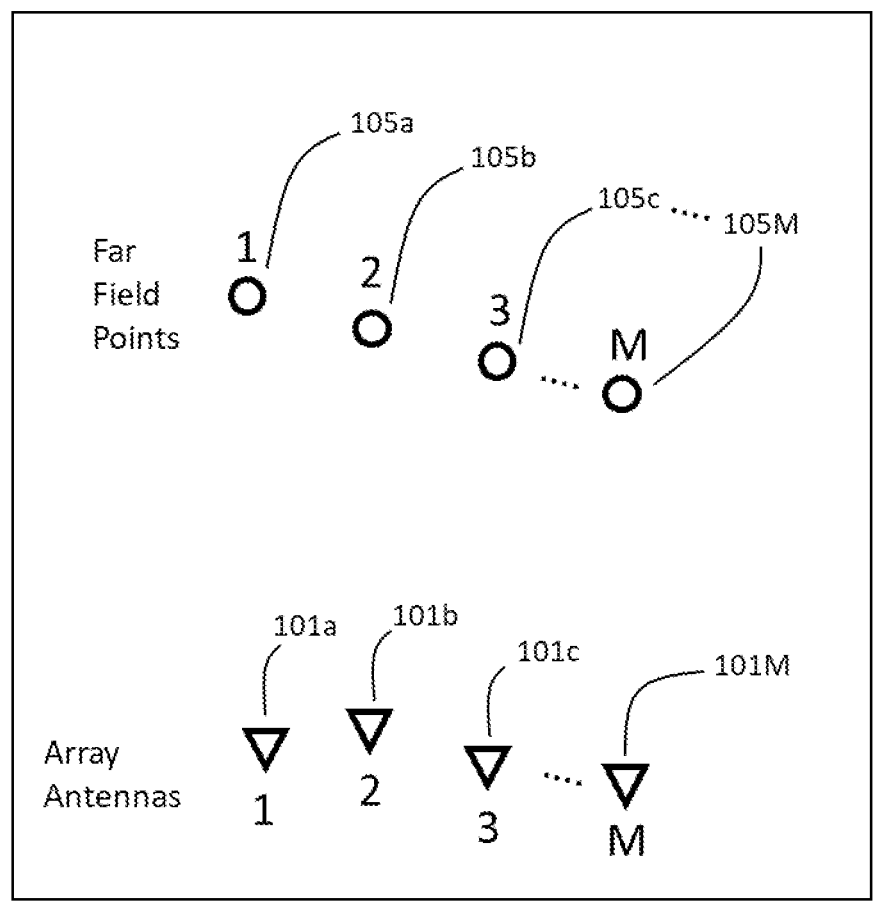
FIG. 3C-FIG. 3C illustrates a multiplicity of far field points, 105a through 105M, and the corresponding multiplicity of antennas, 101a through 101M, in the array. Again it should be noted that the actual distance from the multiplicity of antennas, 101a through 101M, to the multiplicity of far field points, 105a through 105M, would be larger than the physical size of the array of antennas.

Wave Mechanics operates by generating a collection of points in the far field. This is shown by FIG. 3C. Note that the drawing shows the Fair Field points close to the array antennas. For sake of argument, and not requiring a very large drawing, it should be noted that the actual distance from the multiplicity of antennas, 101a through 101M, to the multiplicity of far field points, 105a through 105M, would be much larger than the physical size of the array of antennas.

For consistency, the two dimensional displacement vector will be denoted by using the convention of:

$$r_{ij} = r_{from, to}$$

Figure 3D:
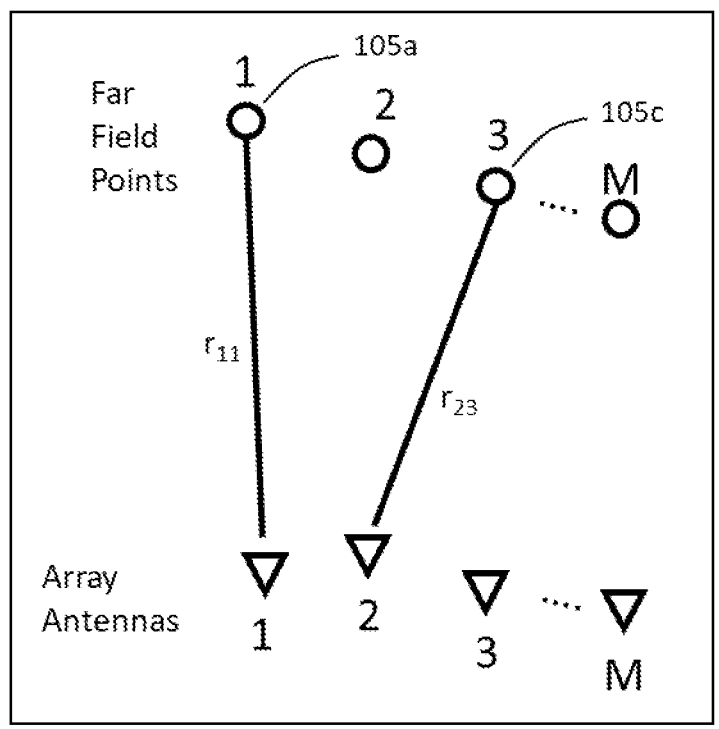
FIG. 3D-FIG. 3D illustrates the nomenclature for the range $r_{ij}$, where the $i^{th}$ component specifies the source antenna number (or transducer reference number, for acoustics) and the $j^{th}$ component specifies the far field point reference number. For example, range $r_{23}$ is the range between antenna #2 and far field point #3, 105c.

That is, the first component in the subscript is the value of the antenna reference number in the array, and the second component in the subscript is the referenced far field point. Thus the "from" value is the antenna (number), and the "to" value is the reference point in the far field. This is shown more clearly in FIG. 3D.

Figure 3E:
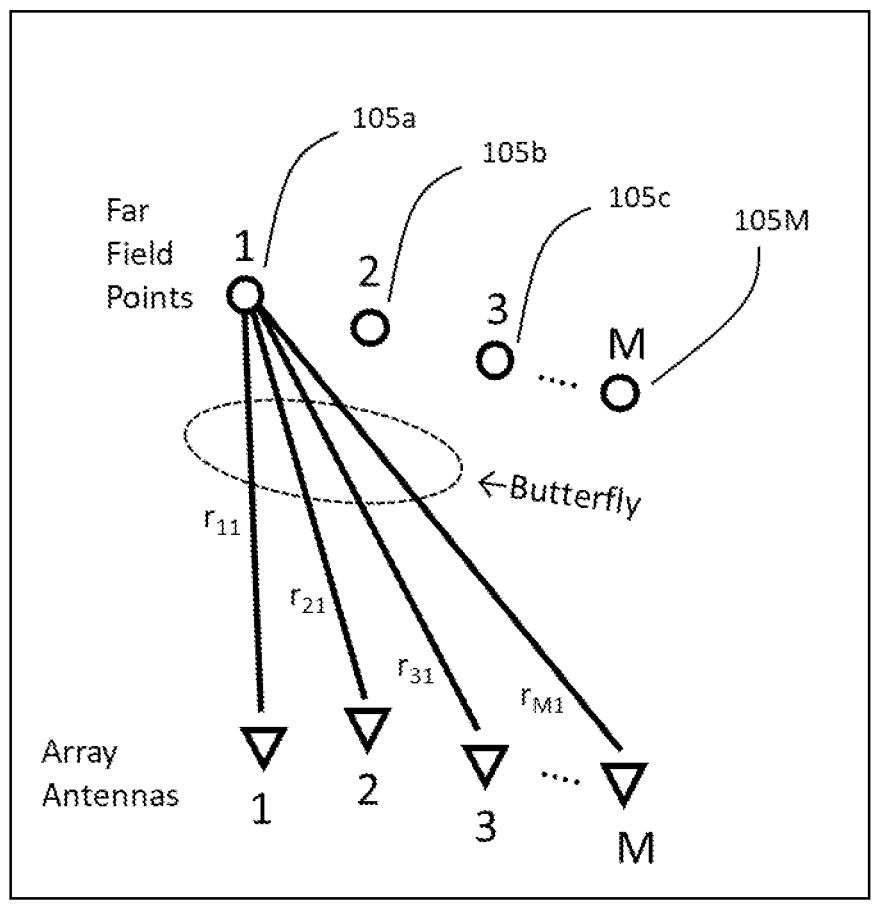

The weighted voltage at Far Field Point #1, shown by FIG. 3E, is expressed as:

$$V_1(f, t) = h_1 \frac{1}{r_{11}} e^{(kr_{11} + \omega t)} + h_2 \frac{1}{r_{21}} e^{(kr_{21} + \omega t)} + \ldots + h_M \frac{1}{r_{M1}} e^{(kr_{M1} + \omega t)} \quad (10)$$

FIG. 3E illustrates the set of ranges from each antenna, to far field point #1, 105a. The total field at far field point #1, 105a, is the summation of the fields generated from the multiplicity of antennas, 101a through 101m, with respective ranges $r_{11}, r_{21}, \ldots r_{M1}$. This collection of ranges to a single point can be denoted as a "butterfly". It is similar to the butterfly used in generating Fast Fourier Transforms (FFT) in Digital Signal Processing.

A finite bandwidth signal, s(t), can be coherently injected into each antenna. Therefore (10) can be expressed, with s(t), as:

$$s(t) \left\{ h_1 \frac{1}{r_{11}} e^{j(kr_{11} + \omega t)} + h_2 \frac{1}{r_{21}} e^{j(kr_{21} + \omega t)} + \ldots + h_M \frac{1}{r_{M1}} e^{j(kr_{M1} + \omega t)} \right\} = V_1 \quad (11)$$

Figure 3F:
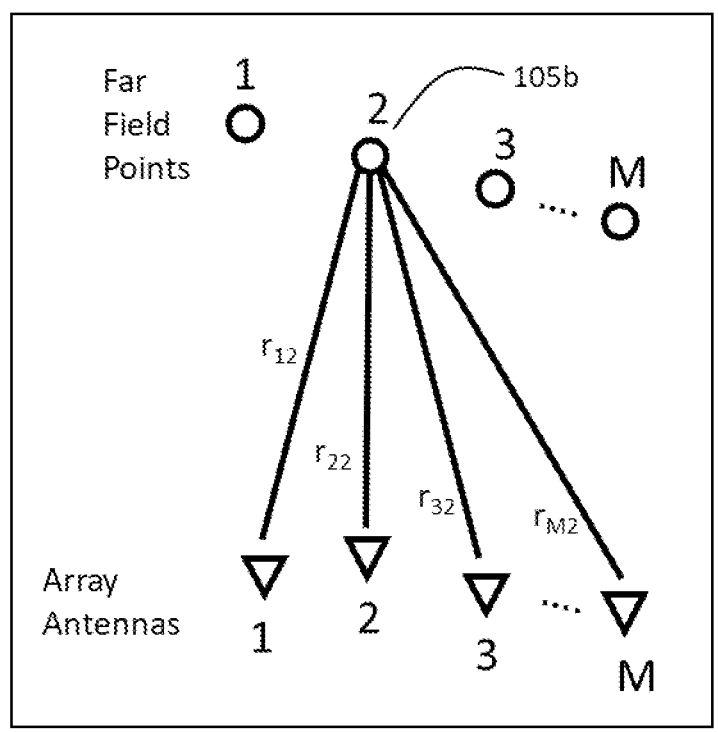
FIG. 3F-FIG. 3F illustrates the set of ranges $r_{ij}$ from each antenna, to far field point #2, 105b. The total field at far field point #2, 105b, is the summation of all the fields generated from the multiplicity of antennas, 101a through 101M. The total field at far field point #2, 105b, is the summation of all the fields generated from the multiplicity of antennas, 101a through 101M, with respective ranges $r_{12}, r_{22}, \ldots r_{M2}$. This is therefore the butterfly for far field point #2, 105b.

The same weights, $\underline{h} = [h_1, h_2, \ldots, h_M]$, can be used to force a voltage at the second (arbitrarily chosen) point, shown by FIG. 3F, in the far field with:

$$s(t) \left\{ h_1 \frac{1}{r_{12}} e^{j(kr_{12} + \omega t)} + h_2 \frac{1}{r_{22}} e^{j(kr_{22} + \omega t)} + \ldots + h_M \frac{1}{r_{M2}} e^{j(kr_{M2} + \omega t)} \right\} = V_2 \quad (12)$$

FIG. 3F illustrates the set of ranges $r_{ij}$ from all antennas, to far field point #2, 105b. The total field at far field point #2, 105b, is the summation of the fields generated from the multiplicity of antennas, 101a through 101m. The total field at far field point #2, 105b, is the summation of the fields generated from the multiplicity of antennas, 101a through 101m, with respective ranges $r_{12}, r_{22}, \ldots r_{M2}$. This is another butterfly, with ranges from all antennas, yet to different far field point, 105b.

This can be continued, to the $M^{th}$ far field point, as:

$$s(t) \left\{ h_1 \frac{1}{r_{1M}} e^{j(kr_{1M} + \omega t)} + h_2 \frac{1}{r_{2M}} e^{j(kr_{2M} + \omega t)} + \ldots + h_M \frac{1}{r_{MM}} e^{j(kr_{MM} + \omega t)} \right\} = V_M \quad (13)$$

The relationships in (11), (12), through (13) can be expressed in matrix form as:

$$s(t) \begin{bmatrix} \frac{1}{r_{11}} e^{j(kr_{11} + \omega t)} & \frac{1}{r_{21}} e^{j(kr_{21} + \omega t)} & \ldots & \frac{1}{r_{M1}} e^{j(kr_{M1} + \omega t)} \\ \frac{1}{r_{12}} e^{j(kr_{12} + \omega t)} & \frac{1}{r_{22}} e^{j(kr_{22} + \omega t)} & \ldots & \frac{1}{r_{M2}} e^{j(kr_{M2} + \omega t)} \\ \frac{1}{r_{1M}} e^{j(kr_{1M} + \omega t)} & \frac{1}{r_{2M}} e^{j(kr_{2M} + \omega t)} & \ldots & \frac{1}{r_{MM}} e^{j(kr_{MM} + \omega t)} \end{bmatrix} \begin{bmatrix} h_1 \\ h_2 \\ \vdots \\ h_M \end{bmatrix} = \begin{bmatrix} V_1 \\ V_2 \\ \vdots \\ V_M \end{bmatrix} \quad (14)$$

Figure 3G:
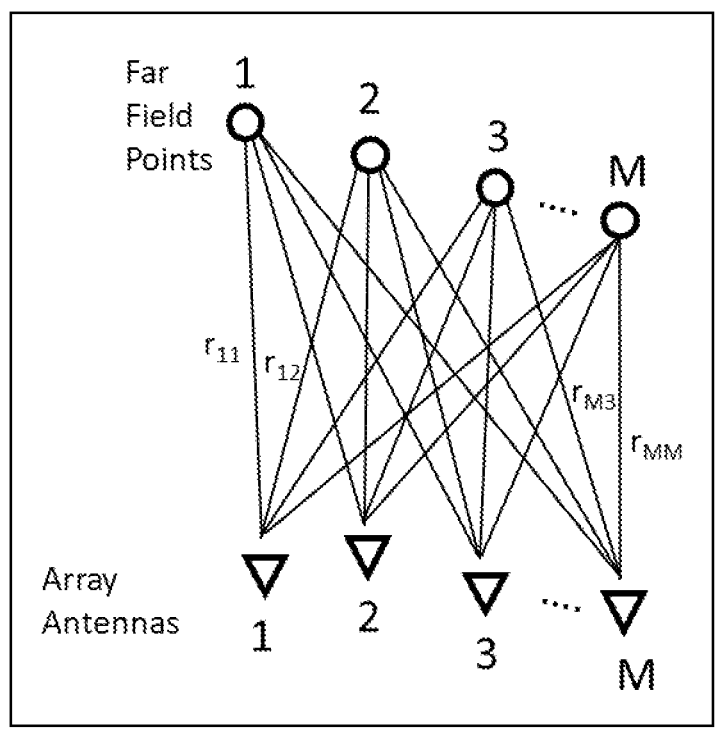
FIG. 3G-FIG. 3G illustrates the collection of "butterflies", from all antennas, to the respective far field points, 105a through 105M.

This embodiment can be represented by the drawing in FIG. 3G. FIG. 3G illustrates the collection of "butterflies", from all antennas, to the respective far field points, 105a through 105m.

It should be noted that the message signal, s(t), can be literally any (modulated) signal with finite bandwidth. This can include a Digital Radio Frequency Memory (DRFM) signal.

Notice that since all signals are coherently RF converted, with synchronized initial phases, then the time dependence is the same for all components. This time dependence can be removed from all matrix values, to a constant multiplied by the matrix, expressed as:

$$(s(t)e^{(j\omega t)})\begin{bmatrix} \frac{1}{r_{11}}e^{jkr_{11}} & \frac{1}{r_{21}}e^{jkr_{21}} & \dots & \frac{1}{r_{M1}}e^{jkr_{M1}} \\ \frac{1}{r_{12}}e^{jkr_{12}} & \frac{1}{r_{22}}e^{jkr_{22}} & \dots & \frac{1}{r_{M2}}e^{jkr_{M2}} \\ \frac{1}{r_{1M}}e^{jkr_{1M}} & \frac{1}{r_{2M}}e^{jkr_{2M}} & \dots & \frac{1}{r_{MM}}e^{jkr_{MM}} \end{bmatrix} \begin{bmatrix} h_1 \\ h_2 \\ \vdots \\ h_M \end{bmatrix} = \begin{bmatrix} V_1 \\ V_2 \\ \vdots \\ V_M \end{bmatrix} \quad (15$$

The expression in (15) can be rewritten in compact form as:

$$s(t)e^{j\omega t}R_{xx}\underline{h}=\underline{V} \quad (16$$

or $$R_{xx}\underline{h}=\left(\frac{1}{s(t)e^{j\omega t}}\right)\underline{V} \quad (17$$

Solving for $\underline{h}$:

$$\underline{h}=\left(\frac{1}{s(t)e^{j\omega t}}\right)R_{xx}^{-1}\underline{V} \quad (18$$

Note that:

$$k_o = \frac{1}{s(t)e^{j\omega t}} \quad (19$$

can be treated as a constant. Therefore:

$$\underline{h}=k_o R_{xx}^{-1}\underline{V} \quad (20)$$

Which is a more compact form for the expression.

It should be noted, that in the very far field, where $r_{ij}>>>\lambda$, then $$r_{11} \approx r_{12} \approx r_{21} \approx \dots \approx r_{MM} \cong r_o \quad (21)$$

Where $r_o$ is the approximate distance from the center of the array, to the center of the collection of Far Field points. The expression in (15) can be rewritten as:

$$\frac{(s(t)e^{(j\omega t)})}{r_o}\begin{bmatrix} e^{jkr_{11}} & e^{jkr_{21}} & \dots & e^{jkr_{M1}} \\ e^{jkr_{12}} & e^{jkr_{22}} & \dots & e^{jkr_{M2}} \\ e^{jkr_{1M}} & e^{jkr_{2M}} & \dots & e^{jkr_{MM}} \end{bmatrix}\begin{bmatrix} h_1 \\ h_2 \\ \vdots \\ h_M \end{bmatrix} = \begin{bmatrix} V_1 \\ V_2 \\ \vdots \\ V_M \end{bmatrix} \quad (22)$$

Or in compact form:

$$\underline{h}=\left(\frac{r_o}{s(t)e^{j\omega t}}\right)R_{xx}^{-1}\underline{V} \quad (23$$

Again, the value in the parenthesis can be treated as a constant:

$$k_o = \frac{r_o}{s(t)e^{j\omega t}} \quad (24$$

Therefore:

$$\underline{h}=k_o R_{xx}^{-1}\underline{V} \quad (25)$$

This is a more compact form for the expression. This value of $\underline{h}$, for Wave Mechanics, operates on a multiplicity of far field points. This is in comparison to $\underline{h}$ in (9), the beamformer case, which only operates on a single far field point.

Applications:

This relationship (25) can be used in a number of ways.

Figure 4A:
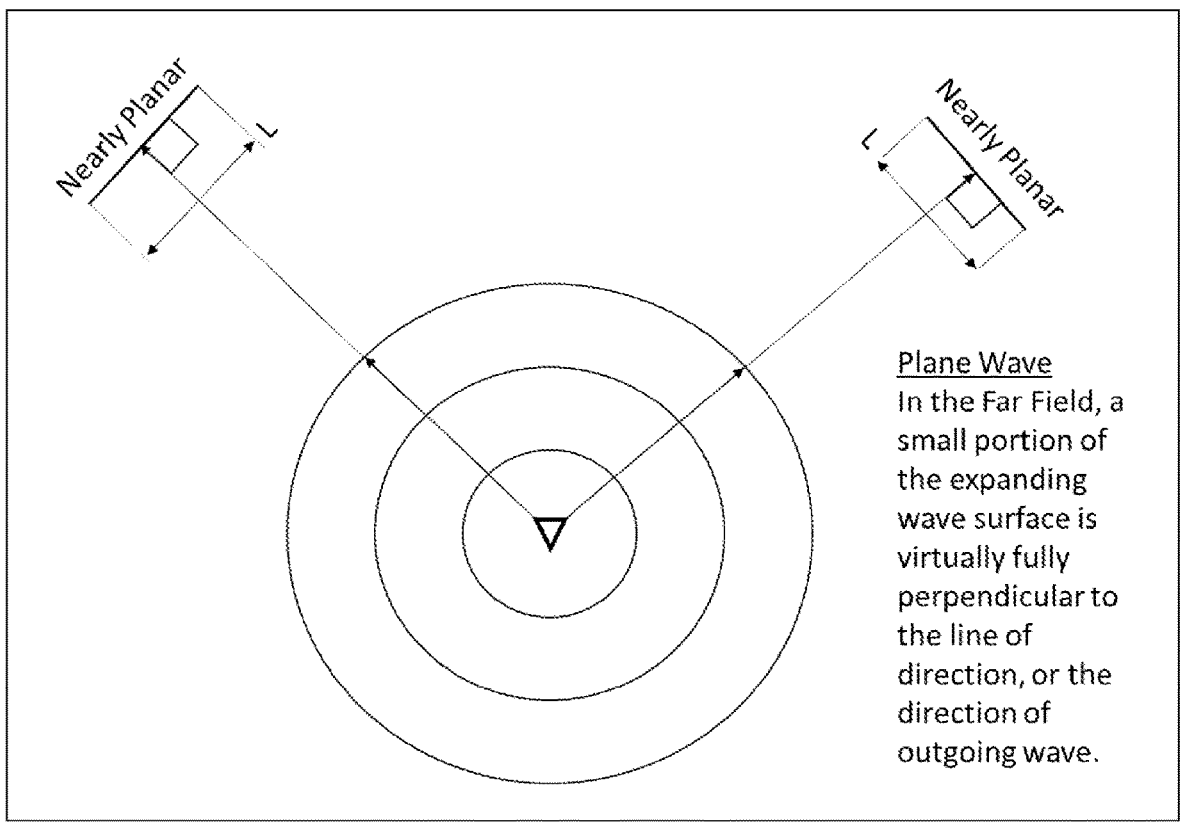
FIG. 4A-FIG. 4A illustrates the growing set of spherical wave fronts, radiated from the source antenna. As the wave front travels outward from the source antenna, the curvature of each (spherical) wave front is reduced; across a given fixed distance, L. At very far distances, small sections of the wave front, L, are effectively planar (flat). Additionally, the planar section is perpendicular to the line of direction or direction of wave propagation.

Plane Wave Rotation:

Wave mechanics can be used to generate a line of points, with equal amplitude and phase, yet not from an angle perpendicular to the pointing vector direction between the center of the array to the center of the collection of points. For this case, all the values in V from (25), would be the same; both in phase and amplitude. However, the Far Field points are not in a line parallel with the original plane wave "wave-front". This is shown more clearly in FIGS. 4A and 4B. In FIG. 4A, a single antenna, or set of beamformed antennas (in an array) generates an expanding wavefront, for a given signal generated at a specific point in time. In the far field, due to the expanding size of the spherical wave, which denotes the signal information at a very small fraction of time, the wave front is nearly planar within a small region of the local space.

Figure 4B:
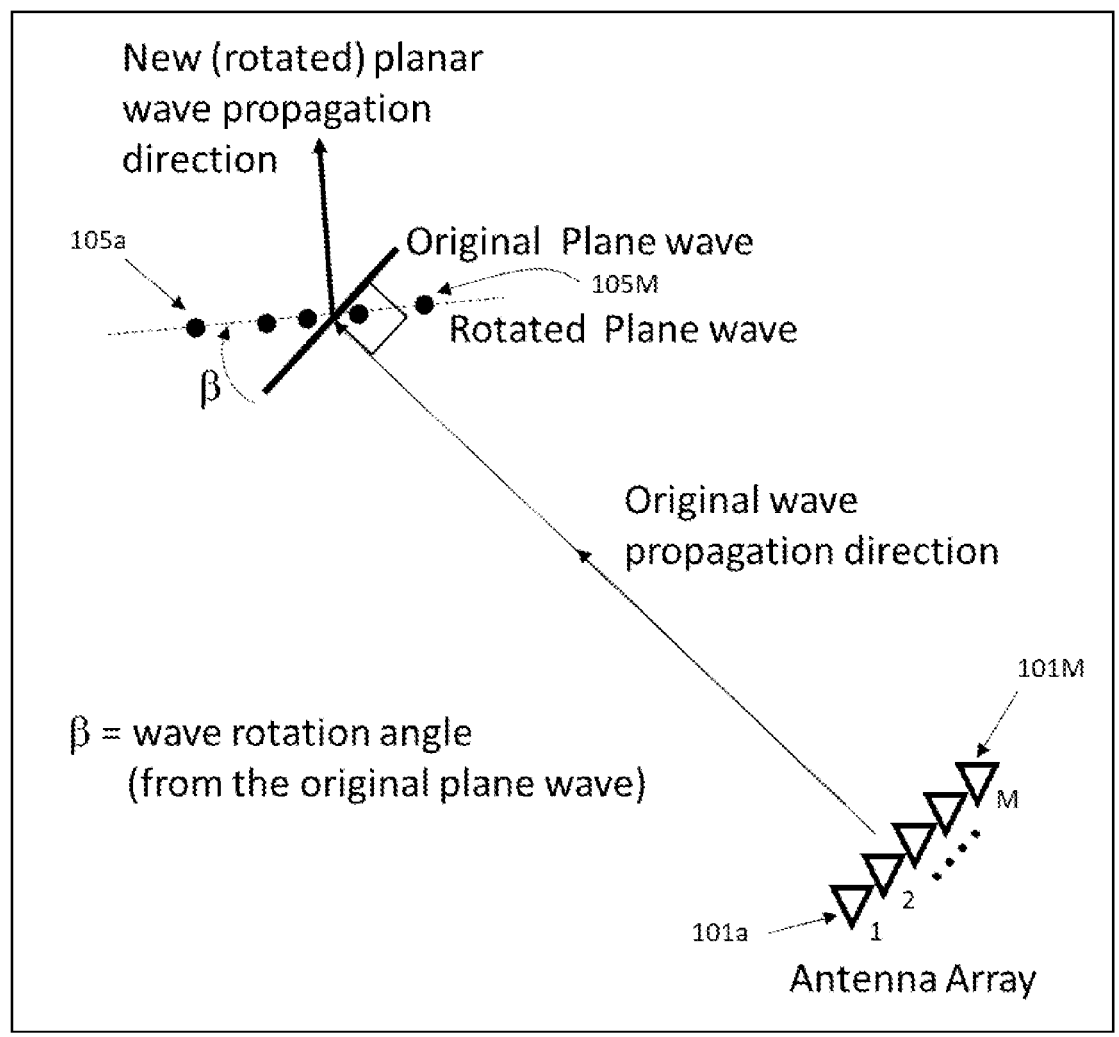
FIG. 4B-FIG. 4B illustrates one embodiment of the Wave Mechanics technique, that of denoting a multiplicity of far field points in space, centered at a given (arbitrary) point in space, to generate a rotated wave. The multiplicity of far field points are spaced along a line that has been rotated from the original planar wavefront, by an angular value of β. This rotation angle can be at any determined angular value. Therefore, the specific location of the far field points, 105a through 105M, have been computed from the location of the Antenna Array points, 101a through 101M, and a specified point along the rotated wave line.
Figure 4C:
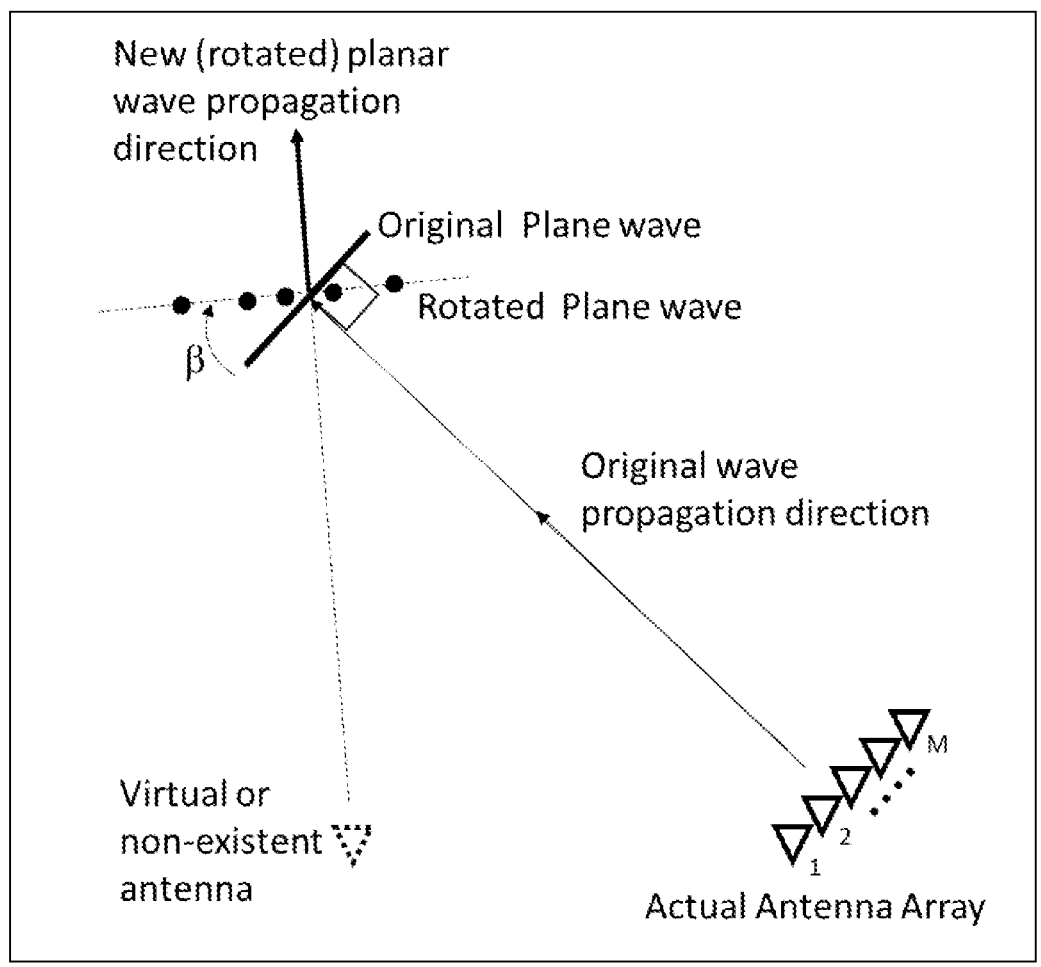
FIG. 4C-FIG. 4C illustrates the wave rotation embodiment of the Wave Mechanics technique, that of denoting a multiplicity of far field points in space, centered at a given point in space, to generate a rotated wave. A receiver, such as a passive Direction Finding System, or radar system, at this location would measure the energy, at a given frequency, and estimate that the wave front bearing angle to a virtual or non-existent antenna or array, as shown in the diagram. This mechanism would thus fool or spoof such a passive or active receiving array.

In FIG. 4B, the exact locations are computed for a set of M points (show by red dots) in the Far Field, arranged along in a line. This line, of points, has been rotated from the original/natural plane wave by an angle β. Using this angle β, the line for the rotation wave has been computed, and points have been arranged along the line. Location and separation distance of these points are based on desired characteristics of the rotated wave. The new direction of propagation, of this rotated wave, is shown by the red array. The newly generated wave front has wave characteristics identical to that of a natural wave, but launched by a virtual (non-existent) antenna or array that is far to the left of the actual array, shown as a collection of M antennas in the drawing. This is shown more clearly in FIG. 4C. Applications include, but are not limited, to spoofing or fooling (RF) Surface to Air Missile systems, incoming missiles, and (Acoustic) decoys to fool torpedo's or submarine acoustic detection and tracking systems.

Figure 4D:
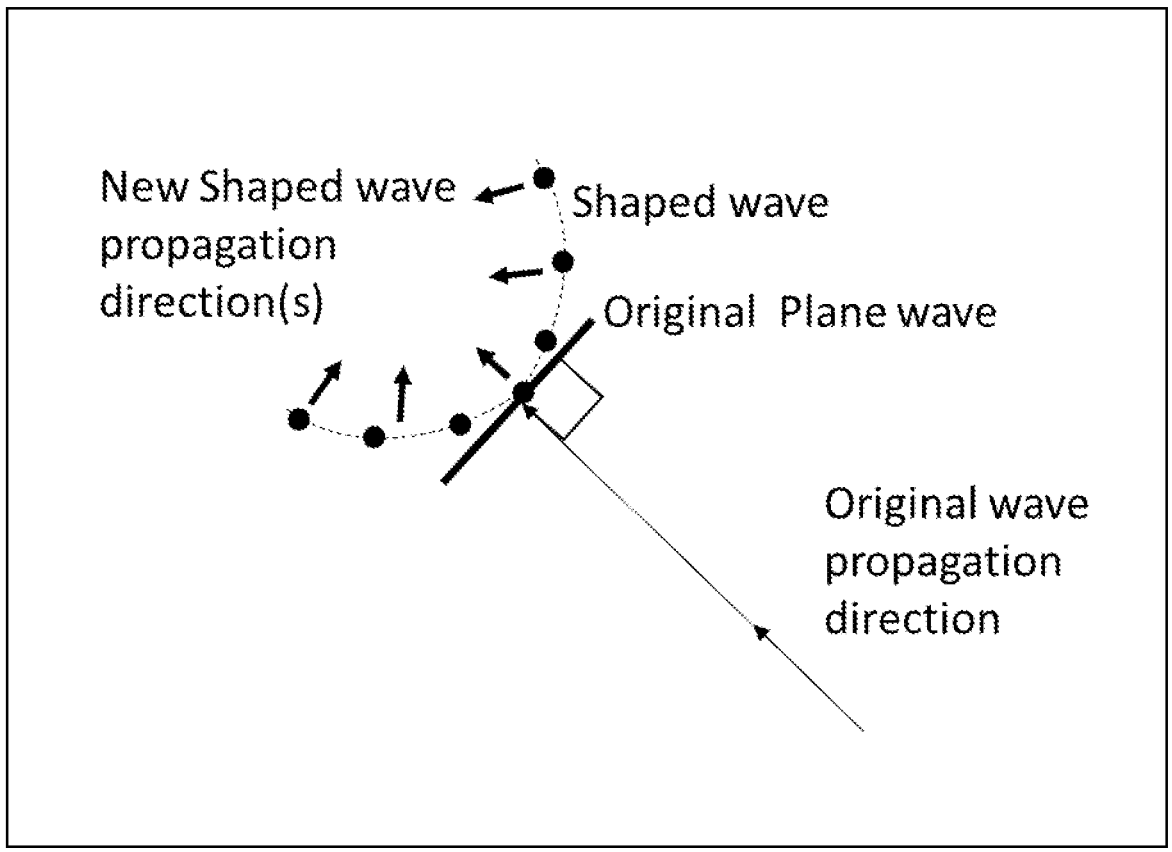
FIG. 4D-FIG. 4D illustrates another embodiment of the Wave Mechanics technique, that of shaping an arbitrary wave in the far field. The shaping of this wave could be multiple configurations, specified by the location of far field points 105a through 105M.

Wave Shaping with Similar Phase and Amplitude:

Wave mechanics can be used to shape the wave, at some location in the Far Field. FIG. 4D shows a collection of wave points, shaped in a half circle. The apparent line of wave propagation appears as coming from multiple angles, for a potential receiver at the center of the circle. For this case, again, all components of $\underline{V}$ are the same value; in both amplitude and phase.

Wave Shaping with Phase and/or Amplitude

An application could be constructed with a desired shaped or rotated wave, but with dis-similar phase and or amplitude values in $\underline{V}$.

Comments:

For a given carrier frequency, the matrix Rxx is based solely on geometry; that is displacements between each antenna and each Far Field location point.

The Wave Mechanics resultant effectively generates a greater multiplicity of N beamformed points, along the rotation of shaped where, where N>>>M. This is more clearly shown in FIG. 4E.

Figure 4E:
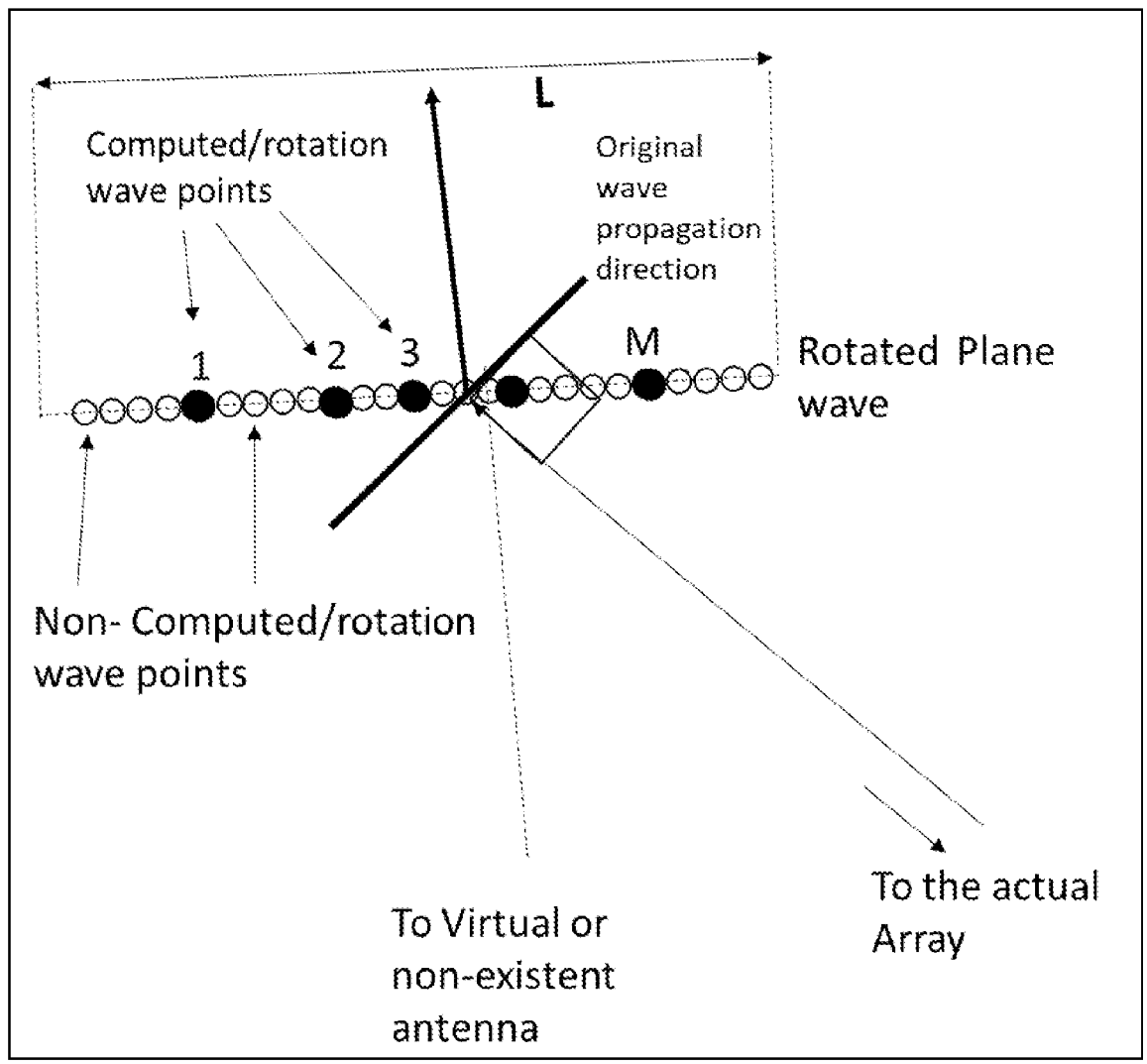
FIG. 4E-FIG. 4E illustrates an effect of the wave rotation mechanism. While a finite number of far field points, M, 105a through 105M, have been specified, the effect of the wave rotation mechanism is to generate similar phase and amplitude to the M points, but at also an an infinite collection of points along the rotated wave. Note, this rotated wave will have a finite length, L, determined by many factors, such as the number of elements in the transmit array, the operational frequency, and other physical factors.

The Rotated Plane Wave line, shown in FIG. 4E consists of the computed and described M Far Field point (shown in solid red) as well as the near-infinite non-computed points (shown in non-solid red) along the rotated wave line. These non-computed points, as well as all computed (solid red) lines will have similar beamformed power levels. This is analogous to a beamformed "wall" rather than a single beamformed point. Therefore, the rotated wave will have similar power level across the full wave corridor, similar to a section of the original (non-rotated) wave.

Figure 5A:
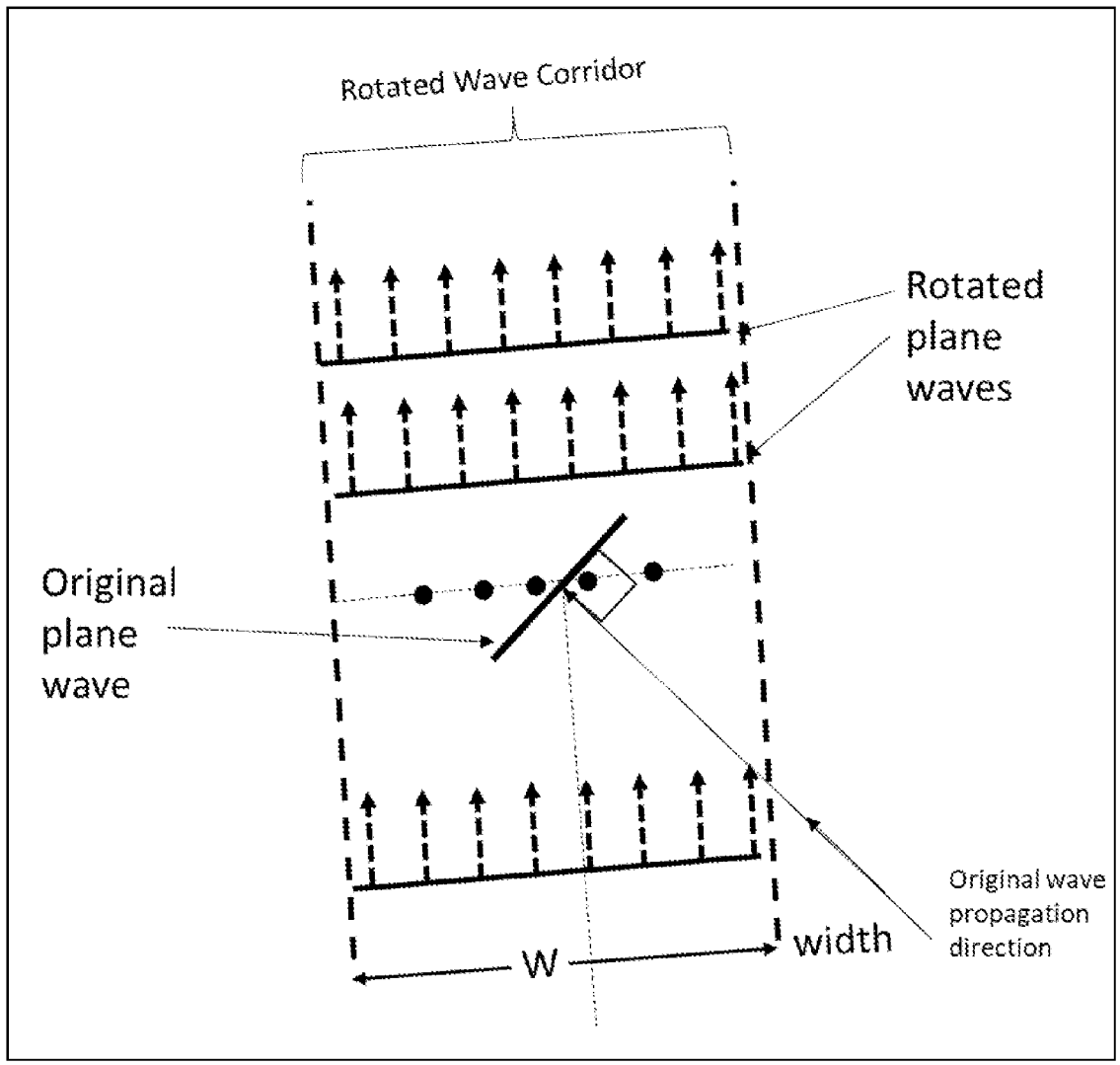
FIG. 5A-FIG. 5A illustrates another potential effect of the wave rotation mechanism. The rotated wave will have a finite width and possibly length, determined by many factors, such as the number of elements in the transmit array, the operational frequency, and other physical factors. Therefore, the rotated wave would appear to travel in a rotated corridor, different in propagation direction than the original wave propagation angle. This corridor could have finite length or infinite length.
Figure 5B:
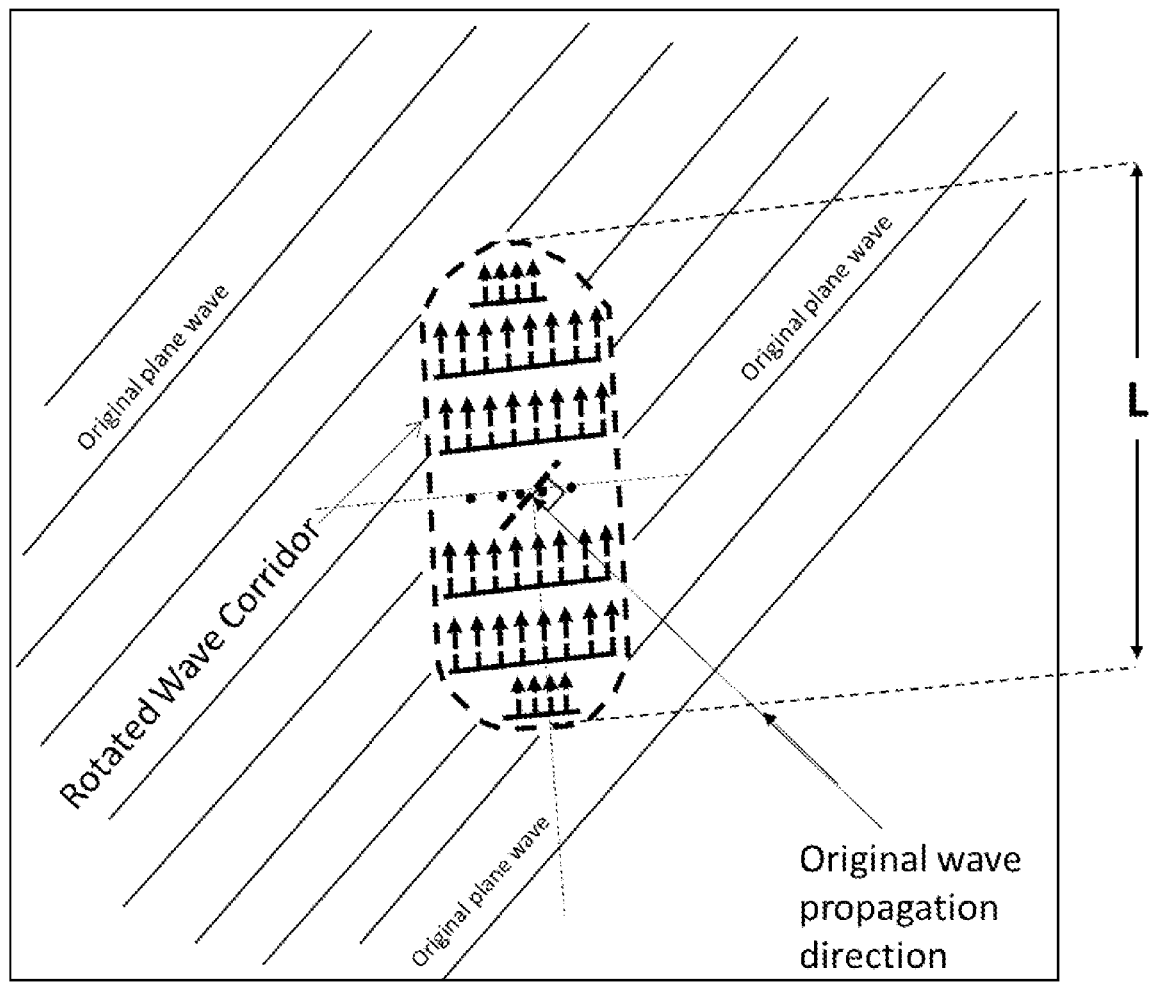
FIG. 5B-FIG. 5B illustrates another potential effect of the wave rotation mechanism, for the wave traveling in a corridor This corridor could have finite length, L.

In certain embodiments, the rotated wave(s) could travel in a finite width and finite length corridor. For certain embodiments, unlike conventional RF Beamforming, the rotated waves might not propagate to infinity. Thus, the wave rotation effect could be limited in range, from the center of the collection of Far Field computed points. This is shown more clearly in FIGS. 5A and 5B. The Corridor width, W, and length, L, are determined by the number of antennas in the array, M, the frequency, and the separation distance between the Far Field (computed) points.

Wave Mechanics is very different from conventional RF (or acoustic) beamforming. In a conventional Beamformer, $\underline{h}$ only operates on the first (or a single row) of Rxx. That is, beamforming only computes $\underline{h}$ based on a single far field point; which is expressed as a single row of Rxx. In the Wave Mechanics technique, $\underline{h}$ includes the contribution all rows of Rxx, and thus simultaneously operates on all rows of Rxx.

Figure 6A:
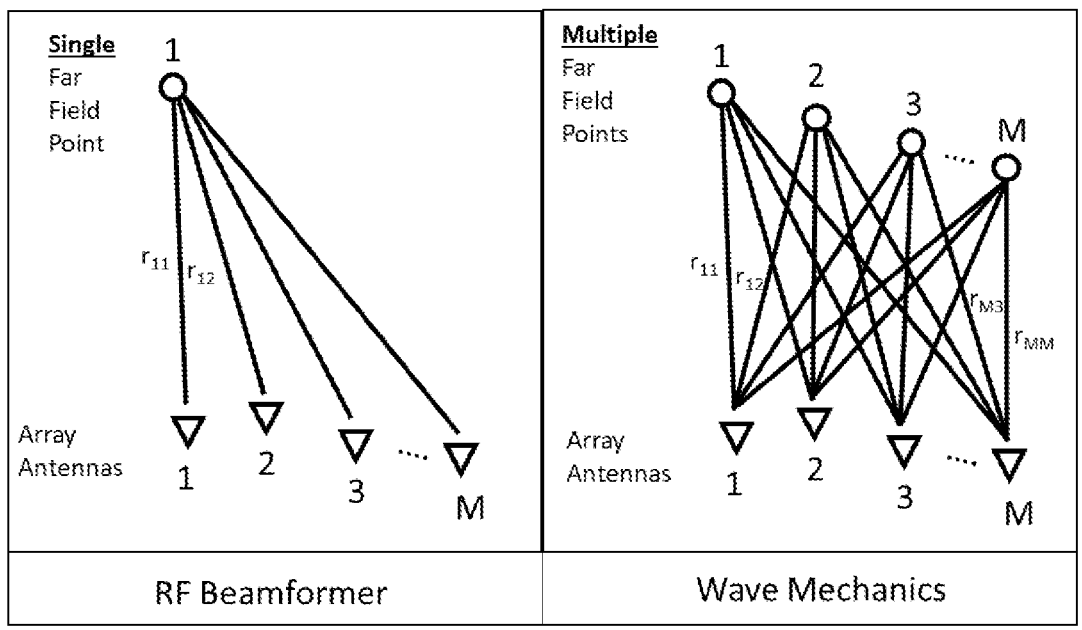

As shown in FIG. 6A, the traditional (conventional) Beamformer computes h to generate RF constructive interference at single point in space. Due to geometry, where $R_{ij} >>> \lambda$, this generates literally an infinitecorridor or beam in the Far Field along the natural wave of propagation. In contrast, the Wave Mechanics technology computes h to generates constructive interference, simultaneously, at a multiplicity of points in space (e.g. the Far Field), and generates the wave rotation or shaping within a finite width corridor in the Far Field.

What is claimed is:

1. A method of wave construction for controlling, rotating, or shaping radio frequency or acoustic waves comprising:
   determining a multiplicity M of points in the far field of a radio frequency (RF) antenna or acoustic transducer array comprising M antennas or transducers,
   determining electric or acoustic field voltages and phases at said M points, wherein said determined voltages and phases emulate the same equipotential voltage and phase characteristics as a natural expanding wave from the array, but rotated or wrapped onto a different virtual surface,
   computing a set of M complex array weights h for the M antennas or transducers based on the determined points and the corresponding determined voltages and phases, wherein the weights h are computed according to $$h = k_o R_{xx}^{-1} V$$

where h is a vector of the weights h for each antenna, $k_o$ is a constant, $R_{xx}$ is an M×M matrix comprising elements $1/r_{ij} \exp(jkr_{ij})$, where $r_{ij}$ is the distance between the ith antenna or transducer and the jth point, and V is a vector of the determined voltages and phases,
   generating a signal for each of the M antennas or transducers, wherein each said signal has a same message signal content of a transmission from a single source, and
   transmitting, from each antenna or transducer, a complex signal formed from the multiplication of a respective generated signal and a respective computed complex array weight,
   wherein the transmitted complex signals combine at the selected far field points to produce a wavefront angle that is not perpendicular to the direction or location of the array antennas or transducers.

2. The method of claim 1, wherein the wave is shaped in the far field by changing locations of the multiplicity of points and generating a linear or non-linear shaped wave.

3. The method of claim 1, wherein the wavefront angle is rotated with respect to the natural expanding wave by a predetermined angle.

4. The method of claim 1, wherein the rotated wavefront is received by a passive direction finding system or radar with an estimated angle that is not perpendicular to the direction or location of the array antennas or transducers.

5. The method of claim 1, wherein the multiplication of the complex signals by the weights produces constructive and destructive interference at the multiplicity of determined points in the far field.

6. The method of claim 1, wherein the multiplicity of points are determined along a virtual line that is rotated from the natural expanding wave by a predetermined angular value.

7. The method of claim 1, wherein the multiplicity of points are determined along a virtual curve that is rotated from the natural expanding wave by a predetermined angular value.

8. The method of claim 1, wherein the multiplicity of points are determined along a virtual line that is rotated from the natural expanding wave by a predetermined angular value, and wherein the transmitted complex signals combine constructively and destructively at said points.

* * * * *